United States Patent [19]

Farrell

[11] 4,424,837

[45] Jan. 10, 1984

[54] MOUNTING DEVICE FOR PARTICULATE MATTER LOADER

[75] Inventor: Thomas R. Farrell, Hercules, Calif.

[73] Assignee: Chevron Research Company, San Francisco, Calif.

[21] Appl. No.: 309,484

[22] Filed: Oct. 7, 1981

[51] Int. Cl.³ .............................................. B65B 1/04
[52] U.S. Cl. ..................................... 141/284; 141/286;
141/387; 141/392; 211/189; 222/405; 239/684;
248/1; 285/24; 285/61; 414/301
[58] Field of Search .................... 239/681, 684, 687;
248/1, 317, 340; 222/405; 414/299, 300, 301;
285/24, 61; 211/189; 141/284, 286, 387, 392

[56] References Cited

U.S. PATENT DOCUMENTS 3,921,684 11/1975 Allen ...................................... 285/24
4,231,398 11/1980 Gibbons ................................. 285/24
4,306,829 12/1981 Loutaty et al. ....................... 414/301

Primary Examiner—Houston S. Bell, Jr.
Attorney, Agent, or Firm—Burns, Doane, Swecker & Mathis

[57] ABSTRACT

A mounting collar for mounting a catalyst oriented packing loader levelly, centrally, and at a fixed axial height in the central axial accessway of a reactor vessel is disclosed. The collar is a rectangular box that sits fixedly, either by fitting tightly into the accessway or by being attached to the part of the vessel surrounding the accessway, and symmetrically about the reactor centerline over the accessway. It has a flat bottom surface that provides a level mating surface with that part of the vessel on which it sits. Its top surface bears slots into which the carriage of the loader fits in a cross lap joint, interlocking manner. The slots are located such that the loader distributor is centered on the axial centerline of the reactor.

9 Claims, 11 Drawing Figures

MOUNTING DEVICE FOR PARTICULATE MATTER LOADER

BACKGROUND OF THE INVENTION

1. Field of the Invention

The invention relates to an apparatus that is used to mount a catalyst oriented packing (COP) loader centrally in the axial accessway of a reactor vessel as a predetermined axial position in the accessway.

2. Description of the Prior Art

COP loaders are commercially used devices that are used to load catalyst or other particulate media such as adsorbents and water softening agents into fixed bed reactor vessels. The basic elements of these loaders are: a rotatable cone or disk/cone catalyst distributor; a funnel that feeds the catalyst onto the rotating distributor; a catalyst hopper; and a conduit (commonly called a "sock") that connects the hopper to the funnel. This assembly is mounted between a pair of beam-like carriage or frame arms that are designed to span the accessway of the reactor vessel, thereby suspending the loader in the accessway. In multibed vessels the carriage arms rest on the vessel internals at the transitions between beds; whereas in single bed vessels the carriage arms typically rest on the flange about the main accessway to the vessel.

COP loaders are designed and intended to provide an even, dense, bed packing. Such packing gives a uniform flow distribution of the reactant(s) or other fluid medium through the bed and longer, better performance. The loader achieves these goals by feeding the catalyst into the bed via the spinning distributor which ideally scatters the catalyst into individual particles that freefall individually and uniformly into the bed. In order for the loader to operate in this manner it must be seated levelly and centrally in the accessway at a fixed, predetermined axial position. If it is not so seated, maldistribution of the catalyst in the bed will occur.

The necessity to seat the loader in a level, central, fixed height manner has caused a significant difficulties in the past, particularly in multibed reactors. The loaders are positioned manually and in the past have been centered by manual measurement and leveled and height adjusted manually with shims. These manual operations were particularly difficult in multibed reactors because of the lack of space and light within the vessels. Also, the loaders must be removed periodically to permit visual inspection of the partly filled bed to ensure proper loading and replaced after each inspection. Such inspections, of course, result in time-consuming recentering, releveling and height readjusting of the loaders.

The present invention addresses the problem of properly mounting COP loaders in reactor accessways and its principal object is to provide a loader mounting device that permits rapid, easy, and accurate placement of the loader.

SUMMARY OF THE INVENTION

The invention is a device for mounting a COP loader in the central axial accessway of a vessel comprising a rigid collar that is adapted, i.e. sized and shaped, to sit fixedly above the accessway and has a substantially planar bottom surface that provides a level mating surface with the part of the vessel that surrounds and defines the accessway and a top surface that provides a seat for the loader carriage, the top surface having loader positioning means that cooperates with the loader carriage to center the distributor in the accessway at a predetermined axial position.

BRIEF DESCRIPTION OF THE DRAWINGS

In the drawings, which are not to scale.

Like parts are referred to by the same reference numerals in the drawings.

DETAILED DESCRIPTION OF THE INVENTION

Figure 1:
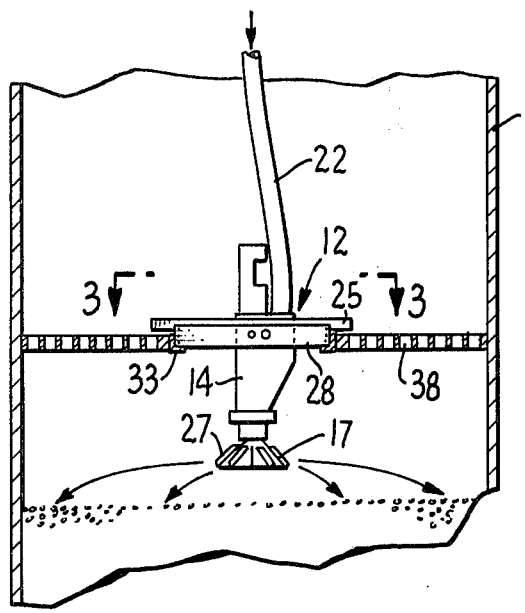
FIG. 1 is a sectional, partial side view of a multibed reactor with a COP loader mounted and in operation in the accessway to an intermediate bed in the reactor.

FIGS. 1-5 illustrate an embodiment of the invention used to mount a COP loader, generally designated 12, in the internal, intermediate accessways between beds in a multibed reactor 13. The loader (FIGS. 1 and 4) includes an axially elongated main housing 14 that supports a motor (not shown) connected to the driving shaft 16 of the loader that extends axially through the housing and carries a conical catalyst distributor 17 whose apex is received in a circular opening 18 in the bottom of the housing. The housing has an entrance opening 19 into which a hose or "sock" 22 is placed. The exit end of the housing defines opening 18. The sock carries the catalyst by gravity from a hopper (not shown) into the housing. The housing has a pair of support bars or pins 23, 24 running transversely (radially) through it whose ends are received in bores in a pair of parallel spaced frame or carriage arms 25, 26. The main housing of the loader is thus suspended between the carriage arms with the driving shaft of the loader located midway between the arms. As shown schematically in FIG. 1, the loader operation involves feeding the particulate media from the hopper through the sock (feed indicated by axial arrow) into the funnel and onto the distributor whih is spun at a predetermined fixed or variable rate by the motor. The particulate feed reaching the distributor is flung radially outwardly by the spinning action with distribution being aided by a series of vanes 27 on the conical surface of the distributor.

Figure 2:
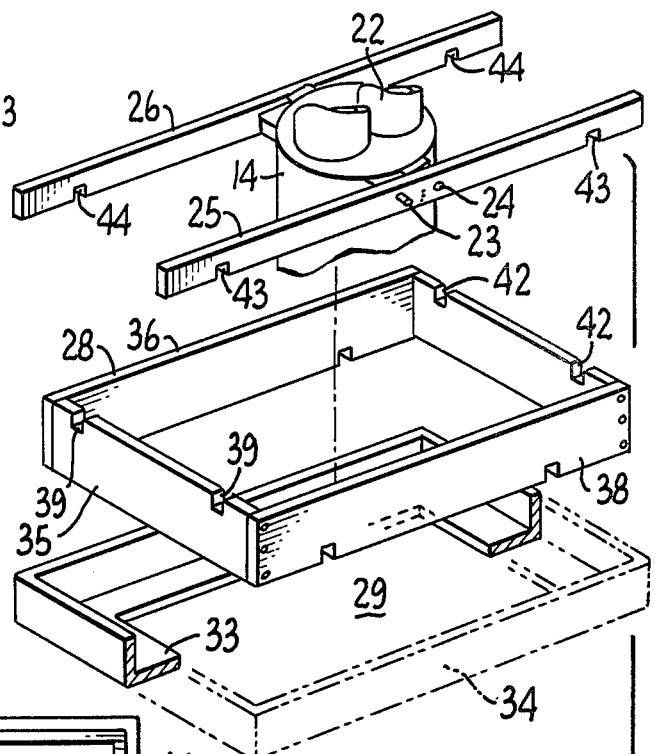
FIG. 2 is an exploded, partly sectional view of a portion of the apparatus shown in FIG. 1.
Figure 3:
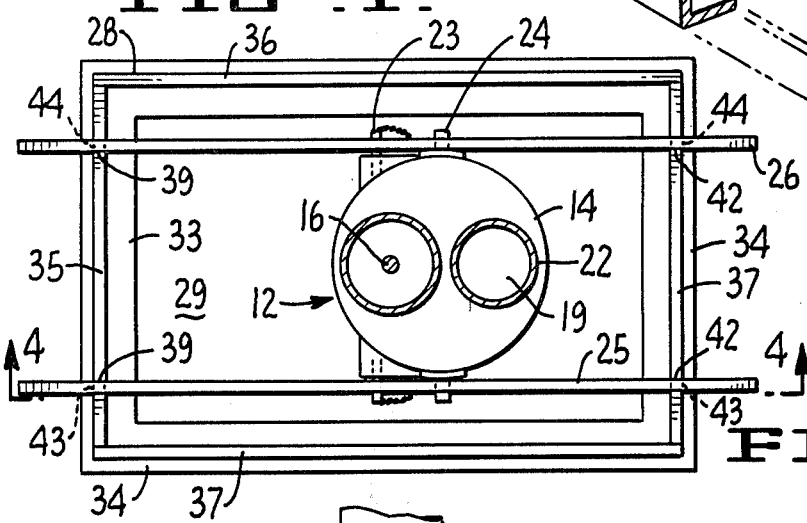
FIG. 3 is a sectional, partial view taken along line 3—3 of FIG. 1.
Figure 4:
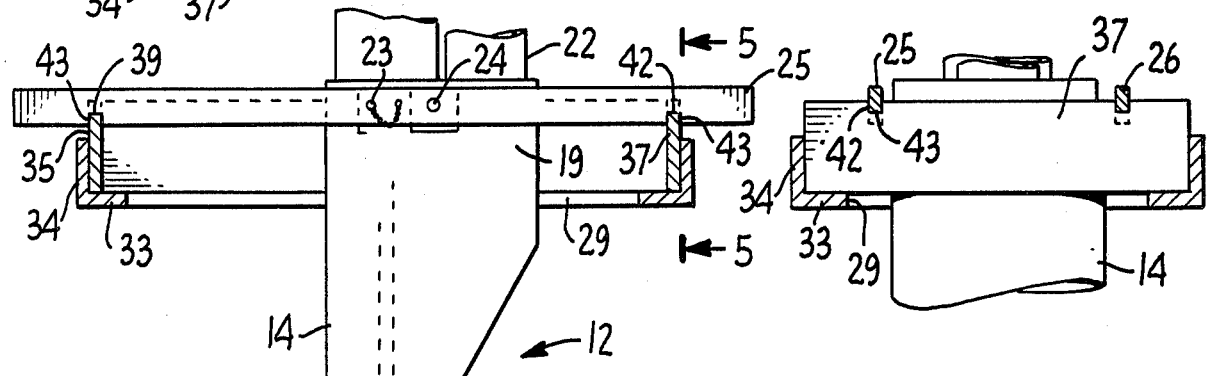
FIG. 4 is a sectional view taken along line 4—4 of FIG. 3.
Figure 5:
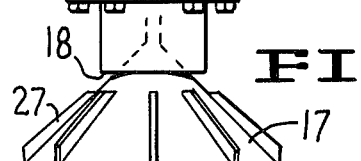
FIG. 5 is a sectional view taken along line 5—5 of FIG. 4.

As stated above, the loader must be positioned in the reactor accessway levelly, centrally and at a predetermined axial location in order to operate properly. Such positioning is accomplished through use of a mounting collar 28. The relationship between the loader, collar, and accessway are best seen in FIGS. 2, 4, and 5. The reactor accessway is a central rectangular opening 29 in a transverse reactor internal 32 (e.g. a fluid distribution plate) that is located between beds and above the bed being loaded. The accessway opening is symmetrical about the reactor centerline. It is defined by a flat radial member 33 that is part of or affixed to internal 32 and is concentrically surrounded by four joined axially upstanding flat walls 34 that together with the radial member form an L-shaped rectangular tray into which the collar fits snugly. In this regard the collar is made from four flat-sided, equal width plates 35, 36, 37, 38 of a light metal, preferably aluminum. The plates are butt joined together at their ends, preferably by bolting to minimize distortion. The outer dimensions of the collar are just slightly smaller than the inner dimensions of the L-shaped tray, thus making substantial radial movement of the collar impossible once it is inserted in the accessway. The bottom edges (FIGS. 4 and 5) of the collar that rest in the tray are substantially planar so that the collar sits levelly within the tray.

The upper edges of the two opposing short plates of the collar each carries a pair of rectangular slots or notches 39, 42, respectively. The slots are spaced equidistant from the midline of the collar and their spacing is equal to the spacing between the loader carriage arms. The widths and depths of the slots are the same and their width is slightly greater than the thickness of the loader carriage arms. As seen in FIG. 2, the bottom edge of each of the carriage arms has a pair of corresponding slots or notches 43, 44, respectively. The slots in the carriage arms are of equal depth to each other and each is slightly wider than the thickness of plates 35 and 37. The spacing between the slots in the carriage arms is the same as the spacing between the two short plates of the collar and each is equidistant from the plane passing through the driving shaft of the loader and intersecting the arms at a right angle. Accordingly, the slots in the bottoms of the carriage arms are designed to mate with and be received by the slots in the short plates of the collar such that when the carriage is mounted on the collar a cross lap joint is formed that interlocks the loader with the collar (FIG. 5) thereby preventing any radial movement of the loader. The locations of the slots relative to each other and to the driving shaft of the loader center the shaft on the centerline of the reactor at a fixed, level, axial position. The particular axial position is determined by the depths of the slots in the carriage arms and in the collar. In a multibed reactor the axial position should be the same at each bed, i.e., at each bed the position of the distributor relative to the bottom of the reactor internal above the bed should be the same. This fixed, interlocking relationship between the carriage and collar make it a relatively easy task to position the loader correctly, remove it if necessary, and reposition it in the same position. No manual leveling, centering, or height adjustment is required.

Figure 6:
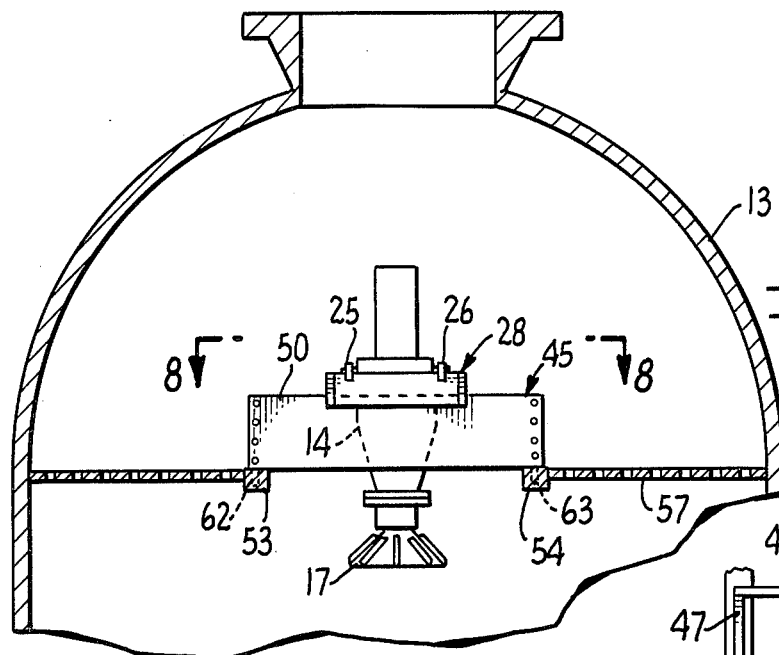
FIG. 6 is a sectional, partial view of the reactor of FIG. 1 with the COP loader mounted in the accessway to the uppermost bed in the reactor.
Figure 8:
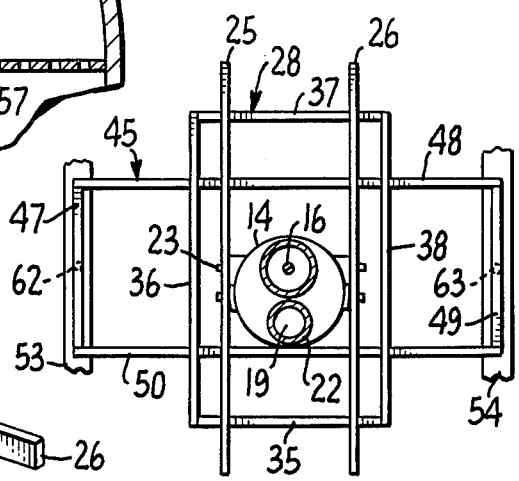
FIG. 8 is a sectional view taken along line 8—8 of FIG. 6.
Figure 7:
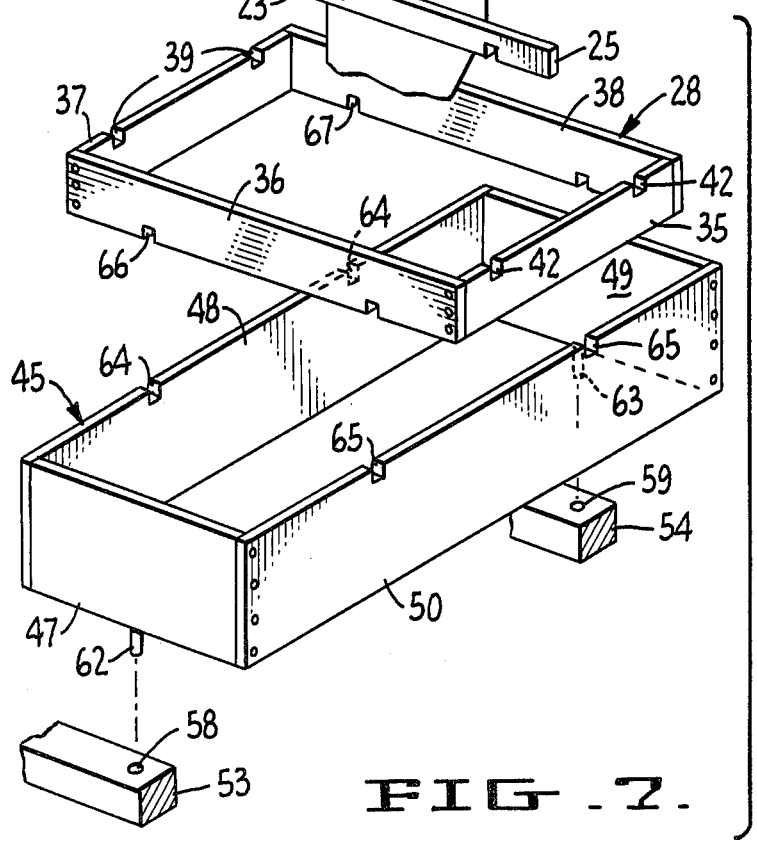
FIG. 7 is an exploded partly sectional view of a portion of the apparatus shown in FIG. 6.

FIGS. 6–8 show another embodiment of the invention that employs two interfitting mounting collars, namely, collar 28 and a second, larger rectangular collar 45. This two collar arrangement is used to mount the loader in the uppermost internal accessway 46 in the reactor. That accessway is also rectangular and symmetrical about the reactor centerline. It is typically larger than the accessways below it and therefore collar 28 is too small to fit this accessway. The use of a second collar, however, accomodates this larger accessway.

The larger collar 45 is also made of four flat equal width plates 47, 48, 49, and 50. It is long enough to just span the accessway 46. The four plates are joined at their ends as in collar 28. The accessway is defined in part by internal transverse support beams 53 and 54 which are connected to the uppermost internal 57 in the reactor. As seen in FIGS. 6 and 8, each beam has a hole, 58, 59, respectively, in its upper edge that is adapted to receive a corresponding pin, 62, 63, respectively, carried on the bottom edges of the short opposing plates of collar 45. The holes and pins are located on the beams and collar such that when collar 45 is placed across the accessway, the pins seat in the holes and fix the collar in place symmetrically about the reactor centerline such that the collar cannot move radially. The bottom edges of the collar plates are substantially planar so that the collar sits levelly on the beams. The top edges of the opposing long plates of collar 45 each has a pair of spaced slots or ways 64, 65, respectively. These slots are slightly wider than the thickness of the long plates of collar 28 and are located equidistant from the collar (and reactor) centerline. These slots are designed to mate with and receive corresponding pairs of slots or ways 66, 67, respectively, in the bottom edges of the long plates of collar 28. Slots 66 and 67 are slightly wider than the thickness of plates 48 and 50 of collar 28 and their spacing is equal to the spacing between those plates. Accordingly, when collar 28 is placed on top of collar 45, the slots in the two collars interlock thereby preventing any radial movement of collar 28.

Once the two collars are in place, the loader is mounted on top of collar 28 in the same manner as described above with respect to FIGS. 1–5. The loader is thus mounted securely in a level, central position in the uppermost accessway of the reactor.

Figure 9:
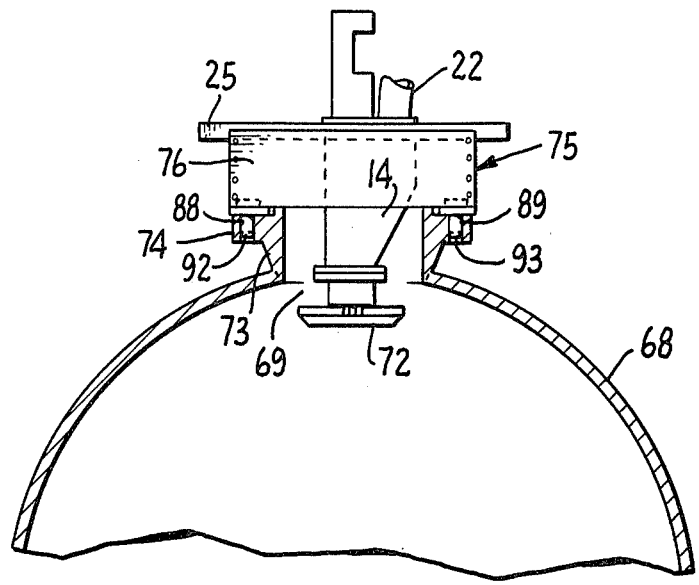
FIG. 9 is an elevational, partly sectional view of a single bed reactor with a COP loader mounted in the main accessway to the reactor.
Figure 11:
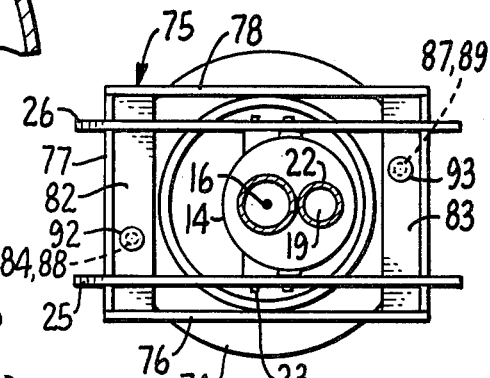
FIG. 11 is a top plan view of a portion of the apparatus shown in FIG. 9.
Figure 10:
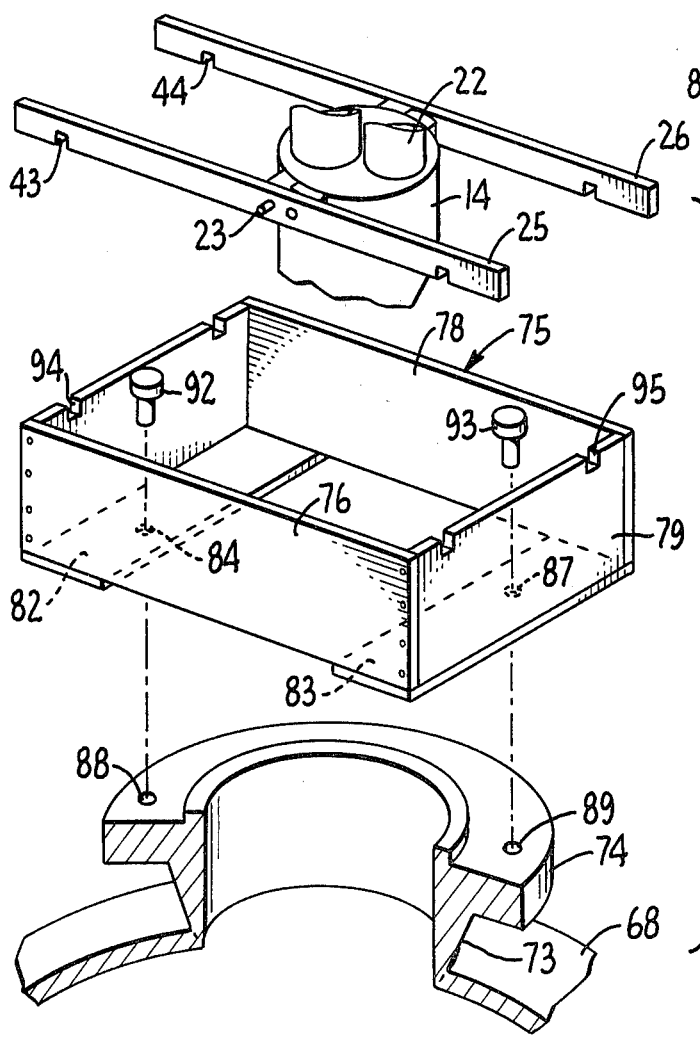
FIG. 10 is an exploded, partly sectional view of the apparatus shown in FIG. 9.

FIGS. 9–11 depict yet another embodiment of the invention that is used to mount a loader in the main accessway to a single bed reactor, designated 68. In such a reactor there are no internal accessways and the catalyst is loaded directly through the main accessway, referenced 69, located at the top of the reactor. The loader that is used to load this reactor is identical to that shown in FIGS. 1–8 except that it is fitted with a disc-shaped distributor 72. As shown, the loader is suspended axially in the main accessway which is defined by a neck member 73 having an outwardly projecting radial flange. The accessway is circular and is symmetrical about the centerline of the reactor. The collar that is used to mount the loader is generally designated 75. It is generally rectangular and is made from four flat equal width plates 76, 77, 78, 79 that are joined at their ends to form a box. In addition, there are flat plates 82, 83, attached to the bottom of the box at each of the short ends. Plates 82, 83 form a pair of inwardly projecting flanges or shelves within the collar. Plates 82, 83 each has an axial hole, 84 and 87, respectively. The holes in the respective plates register with axial holes 88, 89 in the radial flange of the reactor neck. Holes 88 and 89 are equidistant from the reactor centerline.

The collar is mounted on top of the radial flange of the reactor neck by means of bolts 92, 93 that extend through holes 84 and 87 in plates 82 and 83 and are received in the holes in the radial flange. The bottom edge of plates 82 and 83 are substantially planar so that the collar sits levelly on the flange. The collar is thus securely and centrally attached to the reactor about the main accessway. As in the case of collar 28, collar 75 has two pairs of spaced slots 94 and 95 in the top edges of its short plates 77, 79. These slots are slightly wider than the thickness of the carriage arms of the loader and have the same spacing as the carriage arms. They likewise function the same as the slots in the top of collar 28 and receive the slotted portions of the bottom of the loader carriage arms in an interlocking arrangement that prevents radial movement of the loader once it is placed on the collar. The loader is thus mounted in the accessway and is automatically central, level, and at a fied axial position correlated to the desired location of the top of the bed without any further manual adjustment.

Modifications of the above described embodiments of the invention that are obvious to those of ordinary skill in the mechanical engineering, chemical engineering, or related arts are intended to be within the scope of the following claims. Such modifications include, without limitation, other collar shapes to accommodate different accessway shapes, and loader positioning means other than slots, such as pins or bolts and clamps.

I claim:

1. A device for mounting a catalyst oriented packing loader for loading a particulate medium into a vessel through a central axial accessway in the vessel, the loader comprising a carriage on which is fixedly supported a particulate medium distributor and a funnel that is connected to the source of the medium for feeding the medium onto the distributor, said device comprising a rigid collar that:
   (a) includes means for fixedly securing the collar in a predetermined location above the accessway;
   (b) has a substantially planar bottom surface that provides a level mating surface with a planar portion of the vessel that surrounds and defines the accessway; and
   (c) has a top surface that provides a seat for the loader carriage and has loader positioning means that cooperates with the loader carriage to positively fix the position of the carriage relative to the collar and to center the distributor in the accessway at a predetermined axial position.

2. The device of claim 1 wherein the accessway is an internal accessway that is defined and surrounded by a recessed portion of a transverse vessel internal and the means for fixedly securing the collar comprises sizing and shaping the collar for fitting within the recess such that radial movement of the collar is prevented.

3. The device of claim 1 wherein the accessway is an internal accessway that is defined and surrounded by a transverse vessel internal and the means for fixedly securing the collar cooperates with the internal such that radial movement of the collar is prevented.

4. The device of claim 3 wherein the means for fixedly securing the collar to the internal comprises a pair of pins that project axially from the bottom surface of the collar and are received in axial holes in the vessel internal.

5. The device of claim 1 wherein the accessway is the main accessway of a single bed vessel and the means for fixedly securing the collar cooperates with the part of the vessel that defines and surrounds the main accessway such that radial movement of the collar is prevented.

6. The device of claim 5 wherein the means for fixedly securing the collar to said part of the vessel are bolts that are received through holes in the collar and holes on said part.

7. The device of claim 1, 2, 3 or 5 wherein the loader positioning means are slots in said top surface that mate and interlock with slots in the loader carriage, the positions of the slots in the top surface relative to the centerline of the vessel and the position of the slots in the carriage relative to the particulate medium distributor being such that the distributor is centered on the centerline of the vessel.

8. The device of claim 1 wherein the collar is rectangular and is made from four flat equal width plates joined together at their ends.

9. The device of claim 8 wherein the four plates are joined together by bolting.

* * * * *